C. HALSTEAD.
Coffee Apparatus.
No. 219,857. Patented Sept. 23, 1879.
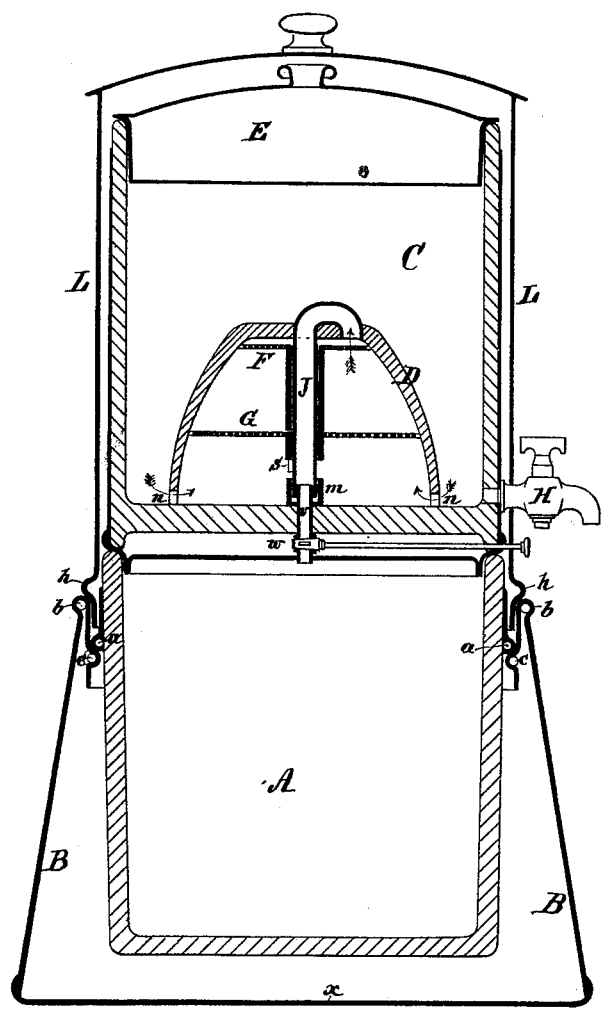

UNITED STATES PATENT OFFICE.

CHARLES HALSTEAD, OF NEW YORK, N. Y.

IMPROVEMENT IN COFFEE APPARATUS.

Specification forming part of Letters Patent No. 219,857, dated September 23, 1879; application filed February 10, 1879.

*To all whom it may concern:*

Be it known that I, CHARLES HALSTEAD, of New York, in the State of New York, have invented a new and Improved Coffee Apparatus, of which the following is a specification.

The accompanying drawing represents a vertical section of a coffee apparatus embodying my invention.

A is a chamber, made of earthenware, having a projecting rim or flange, $a$, some distance below its top at the outside. This chamber A is placed in a metal vessel, B, the top part, $b$, of which is turned inward and downward, and arranged with a projecting rib or ledge, $c$, upon which the flange $a$ of the chamber A rests, supporting thereby said chamber from the top of the vessel B. Into the top of the chamber A, and supported upon the same, a chamber, C, made of earthenware, and inclosed in a metal casing, is fitted. In the top of this chamber C a hollow cover, E, is fitted, which may be filled with water for the purpose of condensing the vapors in the chamber C. Around the chamber C a metal casing, L, is placed, fitting at its bottom into the annular recess formed between the upper part of the vessel B and the upper part of the chamber A, and arranged with a projecting rim, $h$, resting upon the top $b$ of the vessel B. In the bottom of the chamber C a pipe, $v$, is inserted, provided with a suitable valve or cock, $w$, to regulate the flow of the water, fluid, or coffee decoction. Into the bottom of the chamber C an inverted cup or vessel, D, is placed, provided with small openings $n$ $n$ to allow the water in the chamber C to pass into this cup D. From the upper part of this cup D a siphon-pipe, J, passes, fitting over the mouth of the pipe $v$, into an annular recess, $m$, at the upper end of said pipe $v$, forming thus a water-joint between the pipes J and $v$ when the coffee apparatus is in operation. In the cup D two perforated plates or strainers, F and G, are arranged, capable of being removed and held in position by a projection, $s$, on the pipe J, or any other suitable fastening. In the lower part of the chamber C a suitable cock, H, is arranged to draw off the coffee.

The ground coffee is placed between the perforated plates or strainers F and G by removing the plate G, and then again securing the same in its place. The cup D is then placed into the chamber C, with the end of the siphon-pipe J in the annular recess $m$ over the end of the pipe $v$. The vessel B is partially filled with hot water, so as to surround the chamber A, when the chamber C is placed upon the vessel A, and the required quantity of boiling water put into the chamber C, and the cover E placed on its top. The metal casing L is then put over the chamber. C, as above described. The apparatus is then placed on the oven. The hot or boiling water in the vessel B surrounding the chamber A will keep said chamber warm, and will keep any water made to flow into said chamber nearly at boiling-point. The steam or vapors rising from the water in the vessel B will pass between the ribs or projections $a$ and $c$ and enter the casing L, surrounding the chamber C, and retain thereby the water in said chamber C nearly at boiling-point. The valve $w$ in the pipe $v$ is then opened, (more or less,) when the water placed in the chamber C will pass into the inverted cup D, through the ground coffee, between the plates G and F, and through the siphon-pipe J into the chamber A as coffee decoction, having taken the strength, flavor, and aroma out of the ground coffee while passing through the same. The thus made coffee is then emptied out of the chamber A back again into the chamber C, to be drawn off through the cock H, as required. After the made coffee is put back into the chamber C the several parts of the apparatus are put together again as above described, whereby the vapors or steam from the water in the vessel B will keep the thus made coffee warm.

The lower chamber, A, may in this case be removed, and the bottom of the chamber C be so constructed as to be capable of being supported upon the internal rim, $c$, of the vessel B; or a suitable cock or faucet may be arranged near the bottom of the chamber A for the purpose of drawing off the made coffee directly out of this chamber A.

Instead of making the vessel B with a solid bottom, $x$, as here represented, this bottom $x$ may be made perforated, and the internal chambers, A and C, be kept warm by the hot air surrounding the same.

In the above arrangement it will be perceived that by making the chambers A and C and the inverted cup D of china or earthen ware these parts can easily be kept clean, and will not impart any flavor or taste to the decoction made, not belonging to the ground coffee placed between the perforated plates or diaphragm G and F, and which latter pieces are likewise readily removed to be cleaned.

By the arrangement of the siphon-pipe J in the cup D the water is made to pass through the ground coffee upward, and is drawn off from the upper side of the ground coffee, and by arranging a valve, $w$, in this siphon-pipe J the water can be made to pass fast or slow through the ground coffee, as may be desired.

What I claim as my invention, and desire to secure by Letters Patent, is—

1. The combination of the vessel B, china or earthen ware chambers A and C, inverted china or earthen ware cup D, provided with perforated diaphragms F and G and siphon-pipe J, and the surrounding metal casing L, the whole being arranged in the manner and for the purpose substantially as set forth.

2. A china or earthen ware chamber, C, in combination with a china or earthen ware inverted cup, D, with siphon-pipe J and movable perforated diaphragms F and G, arranged to operate in the manner and for the purpose substantially as described.

3. In a coffee-pot, the inverted cup D, with siphon-pipe J, in combination with the drain-pipe $r$, provided with a valve or cock, $w$, substantially as and for the purpose set forth.

CHARLES HALSTEAD.

Witnesses:
HENRY E. ROEDER,
HENRY A. VAN BLARCOM.